(12) United States Patent
Guo et al.

(10) Patent No.: US 12,678,704 B1
(45) Date of Patent: Jul. 14, 2026

(54) RESINS FOR USE IN TOYS AND METHODS OF MAKING THE SAME

(71) Applicant: MGA ENTERTAINMENT INC., Chatsworth, CA (US)

(72) Inventors: Xiao Jian Guo, Dongguan City (CN); Leung Hoi Yan, Kowloon (CN); Lau Ka Keung, Kowloon (CN)

(73) Assignee: MGA ENTERTAINMENT INC., Chatsworth, CA (US)

( * ) Notice: Subject to any disclaimer, the term of this patent is extended or adjusted under 35 U.S.C. 154(b) by 0 days.

(21) Appl. No.: 19/258,775

(22) Filed: Jul. 2, 2025

(51) Int. Cl.
| | |
|---|---|
| *A63H 33/42* | (2006.01) |
| *C08F 2/50* | (2006.01) |
| *C08F 287/00* | (2006.01) |
| *C08K 3/36* | (2006.01) |

(52) U.S. Cl.
CPC ............... *A63H 33/42* (2013.01); *C08F 2/50* (2013.01); *C08F 287/00* (2013.01); *C08K 3/36* (2013.01)

(58) Field of Classification Search
CPC ......... A63H 33/42; C08F 2/50; C08F 287/00; C08K 3/36
See application file for complete search history.

(56) References Cited

U.S. PATENT DOCUMENTS

| | | | | |
|---|---|---|---|---|
| 2015/0136323 A1* | 5/2015 | Messana | ................. | C09J 11/06 |
| | | | | 156/331.7 |
| 2021/0395420 A1* | 12/2021 | Frank | ....................... | C08J 3/243 |
| 2022/0308450 A1* | 9/2022 | Lin | ........................ | H05K 3/287 |
| 2023/0002631 A1* | 1/2023 | Ding | ................... | C08F 220/282 |
| 2023/0135143 A1* | 5/2023 | Hagel | ..................... | C12P 17/10 |
| | | | | 514/415 |
| 2023/0383044 A1* | 11/2023 | Hakamata | ........... | C08F 290/068 |

* cited by examiner

*Primary Examiner* — John E Uselding
(74) *Attorney, Agent, or Firm* — ORBIT IP, LLP

(57) ABSTRACT

Resins for use in toys and methods for making the same are provided. In preferred embodiments, the resins comprise 30% to 55% w/w of Ethoxylated (10) Bisphenol A Diacrylate; 20% to 35% w/w of 1,3-Hexanediol, 2-ethyl-, polymer with 1,6-diisocyanatohexane, 2-hydroxyethyl acrylate- and propylene glycol monoacrylate-blocked; 20% to 30% w/w of Hexanedioic acid, polymer with 1,2-ethanediol and 5-iso-cyanato-1-(isocyanatomethyl)-1,3,3-trimethylcyclo-hexane, 2-hydroxyethyl acrylate-blocked; 1.9%±0.5% w/w of 1-Hydroxycyclohexyl phenyl ketone; 0.43%±0.05% w/w of Ethyl trimethylbenzoyl phenylphosphinate; 0.07±0.05% w/w of Diphenyl (2, 4, 6-trimethyl benzoyl) phosphine oxide; and less than 0.19% w/w of 2-hydroxyethyl acrylate.

19 Claims, 15 Drawing Sheets

Ethoxylated (10) Bisphenol A Diacrylate (CAS No. 64401-02-1)

Polymer 1

Ingredients:

| Substance | CAS No. | Index No. | EC No. | w/w, % | CLP Classification | SCL/M-factor/ATE |
|---|---|---|---|---|---|---|
| 20B UV gel (Liquid) | | | | | | |
| Ethoxylayed (10) bisphenol a diacrylate | 64401-02-1 | - | - | 40-50 | None | - |
| 1,3-Hexanediol, 2-ethyl -, polymer with 1,6 -diisocyanatohexane, 2-hydroxyethyl acrylate- and propylene glycol monoacrylate-blocked | 266692-50-6 | - | - | 20-25 | None | - |
| Hexanedioic acid, polymer with 1,2-ethanediol and 5-isocyanato-1-(isocyanatomethyl)-1,3,3-trimethylcyclohexane, 2-hydroxyethyl acrylate-blocked | 71549-84-3 | - | - | 20-25 | None | - |
| Hydroxy cyclohexyl phenyl ketone | 947-19-3 | - | 213-426-9 | 1.9 | None | - |
| Acid Blue 9 | 3844-45-9 | - | 223-339-8 | 0.5 | None | - |
| Red 40 | 25956-17-6 | - | 247-368-0 | 0.5 | None | - |
| Acid Red 27 | 915-67-3 | - | 213-022-2 | 0.5 | None | - |
| Acid Yellow 23 | 1934-21-0 | - | 217-699-5 | 0.5 | None | - |
| Food Yellow 3 | 2783-94-0 | - | 220-491-7 | 0.5 | Flam. Liq. 2, H225 | - |
| Black catechu | 8001-76-1 | - | 232-291-7 | 0.5 | None | - |
| Ethyl trimethylbenzoyl phenylphosphinate | 84434-11-7 | - | 282-810-6 | 0.43 | Skin Sens. 1B, H317 Aquatic Chronic 2, H411 | - |
| 2-hydroxyethyl acrylate | 818-61-1 | 607-072-00-8 | 212-454-9 | <0.19 | Acute Tox. 4, H302 Acute Tox. 3, H311 Skin Corr. 1B, H314 Skin Sens. 1, H317 Eye Dam. 1, H318 Aquatic Chronic 1, H410 Aquatic Chronic 3, H412 | ATE (oral)=548 mg/kg ATE (dermal)= mg/kg Skin Sens. 1, H317; C≥0.2% M=1 |
| Diphenyl (2,4,6-trimethyl benzoyl) phosphine oxide | 75980-60-8 | 015-203-00.X | 278-355-8 | 0.07 | Skin Sens. 1B, H317 Repr. 1B H360Fd Aquatic Chronic 2, H411 | - |

FIG. 1

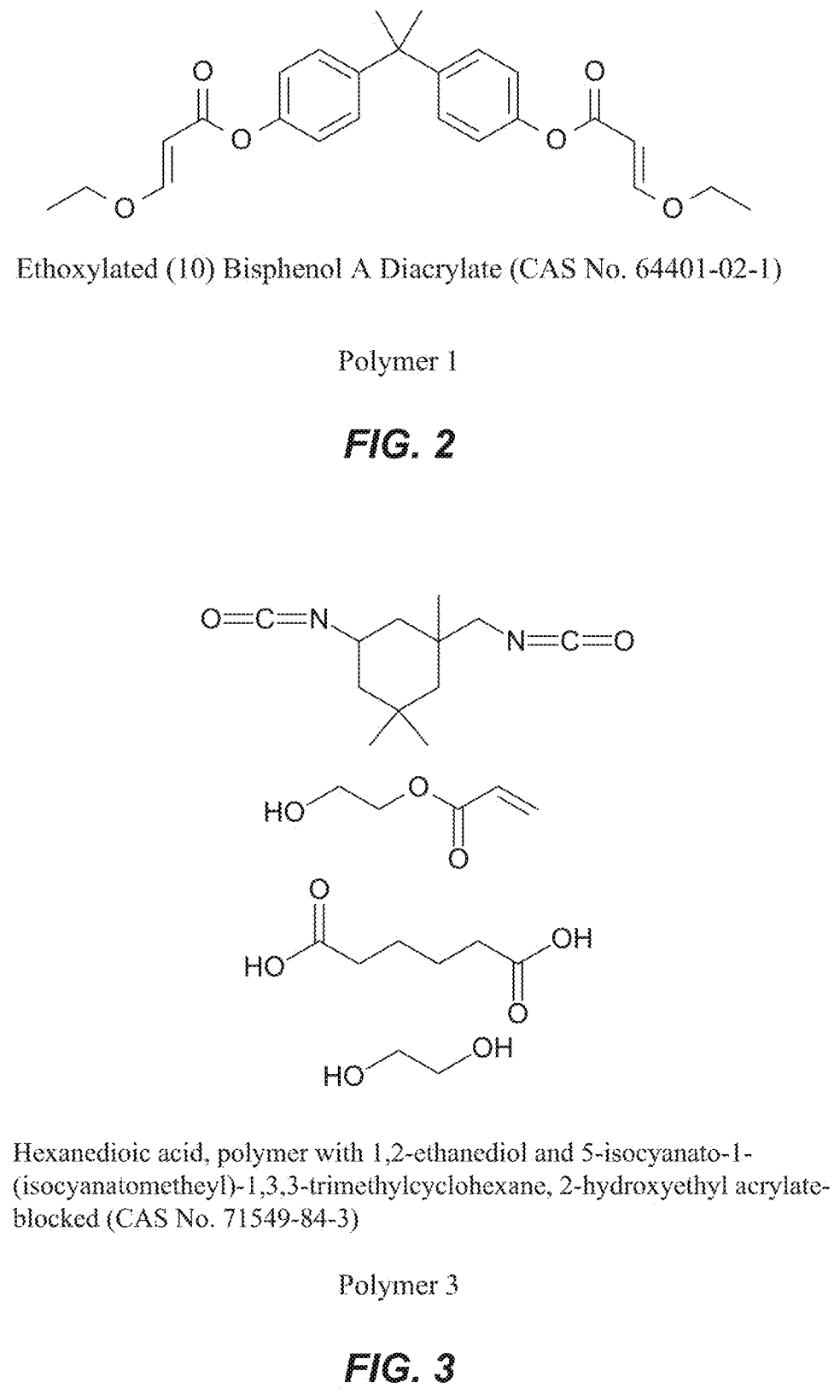

Ethoxylated (10) Bisphenol A Diacrylate (CAS No. 64401-02-1)

Polymer 1

FIG. 2

Hexanedioic acid, polymer with 1,2-ethanediol and 5-isocyanato-1-
(isocyanatometheyl)-1,3,3-trimethylcyclohexane, 2-hydroxyethyl acrylate-
blocked (CAS No. 71549-84-3)

Polymer 3

FIG. 3

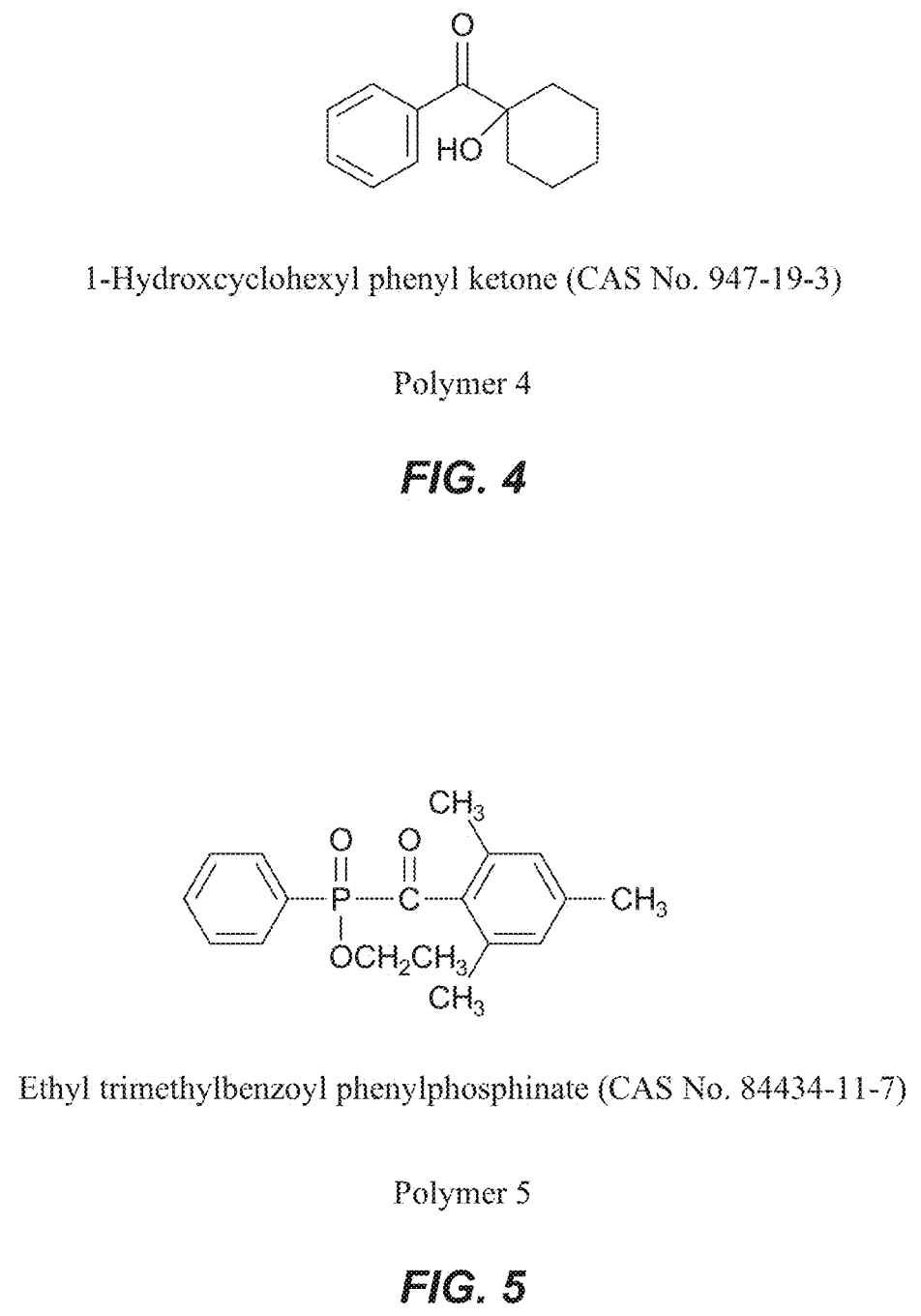

1-Hydroxcyclohexyl phenyl ketone (CAS No. 947-19-3)

Polymer 4

FIG. 4

Ethyl trimethylbenzoyl phenylphosphinate (CAS No. 84434-11-7)

Polymer 5

FIG. 5

Diphenyl (2, 4, 6-trimethyl benzoyl) phosphine oxide (CAS No. 75980-60-8)

Polymer 7

*FIG. 6*

| Ingredients: | | | | | | |
|---|---|---|---|---|---|---|
| Substance | CAS No. | Index No. | EC No. | w/w, % | CLP Classification | SCL/M-factor/ATE |
| 20BB UV gel (Glaze) | | | | | | |
| Ethoxylayed (10) bisphenol a diacrylate | 64401-02-1 | - | - | 30-35 | None | - |
| 1,3-Hexanediol, 2-ethyl -, polymer with 1,6 -diisocyanatohexane, 2-hydroxyethyl acrylate- and propylene glycol monoacrylate-blocked | 266692-50-6 | - | - | 30-35 | None | - |
| Hexanedioic acid, polymer with 1,2-ethanediol and 5-isocyanato-1-(isocyanatomethyl)-1,3,3-trimethylcyclohexane, 2-hydroxyethyl acrylate-blocked | 71549-84-3 | - | - | 25-30 | None | - |
| Silicon dioxide | 7631-86-9 | - | 231-545-4 | 1-5 | None | - |
| Hydroxy cyclohexyl phenol ketone | 947-19-3 | - | 213-426-9 | 1.9 | None | - |
| Acid Blue 9 | 3844-45-9 | - | 223-339-8 | 0.5 | None | - |
| Red 40 | 25956-17-6 | - | 247-368-0 | 0.5 | None | - |
| Acid Red 27 | 915-67-3 | - | 213-022-2 | 0.5 | None | - |
| Acid Yellow 23 | 1934-21-0 | - | 217-699-5 | 0.5 | None | - |
| Food Yellow 3 | 2783-94-0 | - | 220-491-7 | 0.5 | None | - |
| Black catechu | 8001-76-1 | - | 232-291-7 | 0.5 | Flam. Liq. 2, H225 | - |
| Ethyl trimethylbenzoyl phenylphosphinate | 84434-11-7 | - | 282-810-6 | 0.43 | Skin Sens. 1B, H317 Aquatic Chronic 2, H411 | - |
| 2-hydroxyethyl acrylate | 818-61-1 | 607-072-00-8 | 212-454-9 | <0.19 | Acute Tox. 4, H302 Acute Tox. 3, H311 Skin Corr. 1B, H314 Skin Sens. 1, H317 Eye Dam. 1, H318 Aquatic Chronic 1, H410 Aquatic Chronic 3, H412 | ATE (oral)=548 mg/kg ATE (dermal)= mg/kg Skin Sens. 1, H317; C≥0.2% M=1 |
| Diphenyl (2,4,6-trimethyl benzoyl) phosphine oxide | 75980-60-8 | 015-203-00.X | 278-355-8 | 0.07 | Skin Sens. 1B, H317 Repr. 1B H360Fd Aquatic Chronic 2, H411 | - |

*FIG. 7*

O=Si=O silicon dioxide (CAS No. 7631-86-9)

Polymer 8

FIG. 8

Ingredients:

| Substance | CAS No. | Index No. | EC No. | w/w, % | CLP Classification | SCL/M-factor/ATE |
|---|---|---|---|---|---|---|
| *20BD UV gel (Thick)* | | | | | | |
| 1,3-Hexanediol, 2-ethyl -, polymer with 1,6 -diisocyanatohexane, 2-hydroxyethyl acrylate- and propylene glycol monoacrylate-blocked | 266692-50-6 | - | - | 30-35 | None | - |
| Ethoxylayed (10) bisphenol a diacrylate | 64401-02-1 | - | - | 25-30 | None | - |
| Hexanedioic acid, polymer with 1,2-ethanediol and 5-isocyanato-1-(isocyanatomethyl)-1,3,3-trimethylcyclohexane, 2-hydroxyethyl acrylate-blocked | 71549-84-3 | - | - | 25-30 | None | - |
| Silicon dioxide | 7631-86-9 | - | 231-545-4 | 5-9 | None | - |
| Hydroxy cyclohexyl phenol ketone | 947-19-3 | - | 213-426-9 | 1.9 | None | - |
| Acid Blue 9 | 3844-45-9 | - | 223-339-8 | 0.5 | None | - |
| Red 40 | 25956-17-6 | - | 247-368-0 | 0.5 | None | - |
| Acid Red 27 | 915-67-3 | - | 213-022-2 | 0.5 | None | - |
| Acid Yellow 23 | 1934-21-0 | - | 217-699-5 | 0.5 | None | - |
| Food Yellow 3 | 2783-94-0 | - | 220-491-7 | 0.5 | None | - |
| Black catechu | 8001-76-1 | - | 232-291-7 | 0.5 | Flam. Liq. 2, H225 | - |
| Ethyl trimethylbenzoyl phenylphosphinate | 84434-11-7 | - | 282-810-6 | 0.43 | Skin Sens. 1B, H317 Aquatic Chronic 2, H411 | - |
| 2-hydroxyethyl acrylate | 818-61-1 | 607-072-00-8 | 212-454-9 | <0.19 | Acute Tox. 4, H302 Acute Tox. 3, H311 Skin Corr. 1B, H314 Skin Sens. 1, H317 Eye Dam. 1, H318 Aquatic Chronic 1, H410 Aquatic Chronic 3, H412 | ATE (oral)=548 mg/kg ATE (dermal)=298 mg/kg Skin Sens. 1, H317; C≥0.2% M=1 |
| Diphenyl (2,4,6-trimethyl benzoyl) phosphine oxide | 75980-60-8 | 015-203-00.X | 278-353-8 | 0.07 | Skin Sens. 1B, H317 Repr. 1B H360Fd Aquatic Chronic 2, H411 | - |

*FIG. 9*

Ingredients:

| Substance | CAS No. | Index No. | EC No. | w/w, % | CLP Classification | SCL/M-factor/ATE |
|---|---|---|---|---|---|---|
| 20BX UV gel (10% Liquid) | | | | | | |
| Ethoxylayed (10) bisphenol a diacrylate | 64401-02-1 | - | - | 45-55 | None | - |
| 1,3-Hexanediol, 2-ethyl -, polymer with 1,6 -diisocyanatohexane, 2-hydroxyethyl acrylate- and propylene glycol monoacrylate-blocked | 266692-50-6 | - | - | 20-25 | None | - |
| Hexanedioic acid, polymer with 1,2-ethanediol and 5-isocyanato-1-(isocyanatomethyl)-1,3,3 -trimethylcyclohexane, 2-hydroxyethyl acrylate-blocked | 71549-84-3 | - | - | 20-25 | None | - |
| Hydroxy cyclohexyl phenol ketone | 947-19-3 | - | 213-426-9 | 1.9 | None | - |
| Acid Blue 9 | 3844-45-9 | - | 223-339-8 | 0.5 | None | - |
| Red 40 | 25956-17-6 | - | 247-368-0 | 0.5 | None | - |
| Acid Red 27 | 915-67-3 | - | 213-022-2 | 0.5 | None | - |
| Acid Yellow 23 | 1934-21-0 | - | 217-699-5 | 0.5 | None | - |
| Food Yellow 3 | 2783-94-0 | - | 220-491-7 | 0.5 | None | - |
| Black catechu | 8001-76-1 | - | 232-291-7 | 0.5 | Flam. Liq. 2, H225 | - |
| Ethyl trimethylbenzoyl phenylphosphinate | 84434-11-7 | - | 282-810-6 | 0.43 | Skin Sens. 1B, H317 Aquatic Chronic 2, H411 | - |
| 2-hydroxyethyl acrylate | 818-61-1 | 607-072-00-8 | 212-454-9 | <0.19 | Acute Tox. 4, H302 Acute Tox. 3, H311 Skin Corr. 1B, H314 Skin Sens. 1, H317 Eye Dam. 1, H318 Aquatic Chronic 1, H410 Aquatic Chronic 3, H412 | ATE (oral)=548 mg/kg ATE (dermal)=298 mg/kg Skin Sens. 1, H317; C≥0.2% M=1 |
| Diphenyl (2,4,6-trimethyl benzoyl) phosphine oxide | 75980-60-8 | 015-203-00.X | 278-355-8 | 0.07 | Skin Sens. 1B, H317 Repr. 1B H360Fd Aquatic Chronic 2, H411 | - |

*FIG. 10*

Ingredients:

| Substance | CAS No. | Index No. | EC No. | w/w, % | CLP Classification | SCL/M-factor/ATE |
|---|---|---|---|---|---|---|
| 20B Superthin (F798BX) | | | | | | |
| Ethoxylayed (10) bisphenol a diacrylate | 64401-02-1 | - | - | 50-69.5 | None | - |
| 1,3-Hexanediol, 2-ethyl -, polymer with 1,6 -diisocyanatohexane, 2-hydroxyethyl acrylate- and propylene glycol monoacrylate-blocked | 266692-50-6 | - | - | 10-20 | None | - |
| PEG-22 Dimethacrylate | 25852-47-5 | - | - | 2-9 | None | - |
| Hydroxy cyclohexyl phenol ketone | 947-19-3 | - | 213-426-9 | 1.9 | None | - |
| Acid Blue 9 | 3844-45-9 | - | 223-339-8 | 0.5 | None | - |
| Red 40 | 25956-17-6 | - | 247-368-0 | 0.5 | None | - |
| Acid Red 27 | 915-67-3 | - | 213-022-2 | 0.5 | None | - |
| Acid Yellow 23 | 1934-21-0 | - | 217-699-5 | 0.5 | None | - |
| Food Yellow 3 | 2783-94-0 | - | 220-491-7 | 0.5 | None | - |
| Black catechu | 8001-76-1 | - | 232-291-7 | 0.5 | Flam. Liq. 2, H225 | - |
| Ethyl trimethylbenzoyl phenylphosphinate | 84434-11-7 | - | 282-810-6 | 0.43 | Skin Sens. 1B, H317 Aquatic Chronic 2, H411 | - |
| 2-hydroxyethyl acrylate | 818-61-1 | 607-072-00-8 | 212-454-9 | <0.19 | Acute Tox. 4, H302 Acute Tox. 3, H311 Skin Corr. 1B, H314 Skin Sens. 1, H317 Eye Dam. 1, H318 Aquatic Chronic 1, H410 Aquatic Chronic 3, H412 | ATE (oral)=548 mg/kg ATE (dermal)=298 mg/kg Skin Sens. 1, H317; C≥0.2% M=1 |
| Diphenyl (2,4,6-trimethyl benzoyl) phosphine oxide | 75980-60-8 | 015-203-00.X | 278-355-8 | 0.07 | Skin Sens. 1B, H317 Repr. 1B H360Fd Aquatic Chronic 2. H411 | - |

FIG. 11

PEG-22 Dimethacrylate (CAS No. 25852-47-5)

Polymer 9

*FIG. 12*

| Ingredients: | | | | | | |
|---|---|---|---|---|---|---|
| Substance | CAS No. | Index No. | EC No. | w/w, % | CLP Classification | SCL/M-factor/ATE |
| 20A Superthin UV Resin | | | | | | |
| Ethoxylayed (10) bisphenol a diacrylate | 64401-02-1 | - | - | 69.5 | None | - |
| Hexane, 1,6-diisocyanato-, homopolymer, 2-hydroxyethylacrylate- and propylene glycol monoacrylate-blocked | 1392411-89-0 | - | - | 20 | None | - |
| PEG-22 Dimethacrylate | 25852-47-5 | - | - | 7.6 | Skin Irrit. 2, H315 Eye Irrit. 2, H319 STOT SE 3, H335 | - |
| Hydroxy cyclohexyl phenol ketone | 947-19-3 | - | 213-426-9 | 1.9 | None | - |
| Acid Blue 9 | 3844-45-9 | - | 223-339-8 | 0.5 | None | - |
| Red 40 | 25956-17-6 | - | 247-368-0 | 0.5 | None | - |
| Acid Red 27 | 915-67-3 | - | 213-022-2 | 0.5 | None | - |
| Acid Yellow 23 | 1934-21-0 | - | 217-699-5 | 0.5 | None | - |
| Food Yellow 3 | 2783-94-0 | - | 220-491-7 | 0.5 | None | - |
| Black catechu | 8001-76-1 | - | 232-291-7 | 0.5 | Flam. Liq. 2, H225 | - |
| Ethyl trimethylbenzoyl phenylphosphinate | 84434-11-7 | - | 282-810-6 | 0.43 | Skin Sens. 1B, H317 Aquatic Chronic 2, H411 | - |
| 2-hydroxyethyl acrylate | 818-61-1 | 607-072-00-8 | 212-454-9 | <0.19 | Acute Tox. 4, H302 Acute Tox. 3, H311 Skin Corr. 1B, H314 Skin Sens. 1, H317 Eye Dam. 1, H318 Aquatic Chronic 1, H410 Aquatic Chronic 3, H412 | ATE (oral)=548 mg/kg ATE (dermal)=298 mg/kg Skin Sens. 1, H317; C≥0.2% M=1 |
| Diphenyl (2,4,6-trimethyl benzoyl) phosphine oxide | 75980-60-8 | 015-203-00-X | 278-355-8 | 0.07 | Skin Sens. 1B, H317 Repr. 1B H360Fd Aquatic Chronic 2, H411 | - |

FIG. 13

| Ingredients:<br>Substance | CAS No. | Index No. | EC No. | w/w, % | CLP Classification | SCL/M-factor/ATE |
|---|---|---|---|---|---|---|
| 20A UV gel (Liquid) | | | | | | |
| Ethoxylayed (10) bisphenol a diacrylate | 64401-02-1 | - | - | 47.6 | None | - |
| Hexane, 1,6-diisocyanato-, homopolymer, 2-hydroxyethylacrylate-and propylene glycol monoacrylate-blocked | 1392411-89-0 | - | - | 24.75 | None | - |
| Poly(oxy-1,4-butanediyl), .alpha.-hydro-.omega.-hydroxy-, polymer with5-isocyanato-1-(isocyanatomethyl)-1,3,3-trimethylcyclohexane, 2-hydroxyethylacrylate-blocked | 82339-25-1 | - | - | 24.75 | None | - |
| Hydroxy cyclohexyl phenol ketone | 947-19-3 | - | 213-426-9 | 1.9 | None | - |
| Acid Blue 9 | 3844-45-9 | - | 223-339-8 | 0.5 | None | - |
| Red 40 | 25956-17-6 | - | 247-368-0 | 0.5 | None | - |
| Acid Red 27 | 915-67-3 | - | 213-022-2 | 0.5 | None | - |
| Acid Yellow 23 | 1934-21-0 | - | 217-699-5 | 0.5 | None | - |
| Food Yellow 3 | 2783-94-0 | - | 220-491-7 | 0.5 | None | - |
| Black catechu | 8001-76-1 | - | 232-291-7 | 0.5 | Flam. Liq. 2, H225 | - |
| Ethyl trimethylbenzoyl phenylphosphinate | 84434-11-7 | - | 282-810-6 | 0.43 | Skin Sens. 1B, H317<br>Aquatic Chronic 2, H411 | - |
| 2-hydroxyethyl acrylate | 818-61-1 | 607-072-00-8 | 212-454-9 | <0.19 | Acute Tox. 4, H302<br>Acute Tox. 3, H311<br>Skin Corr. 1B, H314<br>Skin Sens. 1, H317<br>Eye Dam. 1, H318<br>Aquatic Chronic 1, H410<br>Aquatic Chronic 3, H412 | ATE (oral)=548 mg/kg<br>ATE (dermal)=298 mg/kg<br>Skin Sens. 1, H317;<br>C≥0.2%<br>M=1 |
| Diphenyl (2,4,6-trimethyl benzoyl) phosphine oxide | 75980-60-8 | 015-203-00.X | 278-355-8 | 0.07 | Skin Sens. 1B, H317<br>Repr. 1B H360Fd<br>Aquatic Chronic 2, H411 | - |

FIG. 14

| | | | | | | |
|---|---|---|---|---|---|---|
| Hexane, 1,6-diisocyanato-, homopolymer, 2-hydroxyethylacrylate- and propylene glycol monoacrylate-blocked | 1392411-89-0 | - | - | 34.7 | None | - |
| Ethoxylayed (10) bisphenol a diacrylate | 64401-02-1 | - | - | 31.4 | None | - |
| Poly(oxy-1,4-butanediyl), .alpha.-hydro-.omega.-hydroxy-, polymer with5-isocyanato-1-(isocyanatomethyl)-1,3,3-trimethylcyclohexane, 2-hydroxyethylacrylate-blocked | 82339-25-1 | - | - | 29.8 | None | - |
| Hydroxy cyclohexyl phenol ketone | 947-19-3 | - | 213-426-9 | 1.9 | None | - |
| Silicon dioxide | 7631-86-9 | - | 231-545-4 | 1.2 | None | - |
| Acid Blue 9 | 3844-45-9 | - | 223-339-8 | 0.5 | None | - |
| Red 40 | 25956-17-6 | - | 247-368-0 | 0.5 | None | - |
| Acid Red 27 | 915-67-3 | - | 213-022-2 | 0.5 | None | - |
| Acid Yellow 23 | 1934-21-0 | - | 217-699-5 | 0.5 | None | - |
| Food Yellow 3 | 2783-94-0 | - | 220-491-7 | 0.5 | None | - |
| Black catechu | 8001-76-1 | - | 232-291-7 | 0.5 | Flam. Liq. 2, H225 | - |
| Ethyl trimethylbenzoyl phenylphosphinate | 84434-11-7 | - | 282-810-6 | 0.43 | Skin Sens. 1B, H317 Aquatic Chronic 2, H411 | - |
| 2-hydroxyethyl acrylate | 818-61-1 | 607-072-00-8 | 212-454-9 | <0.19 | Acute Tox. 4, H302 Acute Tox. 3, H311 Skin Corr. 1B, H314 Skin Sens. 1, H317 Eye Dam. 1, H318 Aquatic Chronic 1, H410 Aquatic Chronic 3, H412 | ATE (oral)=548 mg/kg ATE (dermal)=298 mg/kg Skin Sens. 1, H317; C≥0.2% M=1 |
| Diphenyl (2,4,6-trimethyl benzoyl) phosphine oxide | 75980-60-8 | 015-203-00.X | 278-355-8 | 0.07 | Skin Sens. 1B, H317 Repr. 1B H360Fd Aquatic Chronic 2, H411 | - |

FIG. 15

| Ingredients: | | | | | | |
|---|---|---|---|---|---|---|
| Substance | CAS No. | Index No. | EC No. | w/w, % | CLP Classification | SCL/M-factor/ATE |
| 20AD UV gel (Thick) | | | | | | |
| Hexane, 1,6-diisocyanato-, homopolymer, 2-hydroxyethylacrylate- and propylene glycol monoacrylate-blocked | 1392411-89-0 | - | - | 33.7 | None | - |
| Poly(oxy-1,4-butanediyl), .alpha.-hydro-.omega.-hydroxy-, polymer with5-isocyanato-1-(isocyanatomethyl)-1,3,3-trimethylcyclohexane, 2-hydroxyethylacrylate-blocked | 82339-25-1 | - | - | 29.8 | None | - |
| Ethoxylayed (10) bisphenol a diacrylate | 64401-02-1 | - | - | 27.6 | None | - |
| Silicon dioxide | 7631-86-9 | - | 231-545-4 | 6 | None | - |
| Hydroxy cyclohexyl phenol ketone | 947-19-3 | - | 213-426-9 | 1.9 | None | - |
| Acid Blue 9 | 3844-45-9 | - | 223-339-8 | 0.5 | None | - |
| Red 40 | 25956-17-6 | - | 247-368-0 | 0.5 | None | - |
| Acid Red 27 | 915-67-3 | - | 213-022-2 | 0.5 | None | - |
| Acid Yellow 23 | 1934-21-0 | - | 217-699-5 | 0.5 | None | - |
| Food Yellow 3 | 2783-94-0 | - | 220-491-7 | 0.5 | None | - |
| Black catechu | 8001-76-1 | - | 232-291-7 | 0.5 | Flam. Liq. 2, H225 | - |
| Ethyl trimethylbenzoyl phenylphosphinate | 84434-11-7 | - | 282-810-6 | 0.43 | Skin Sens. 1B, H317 Aquatic Chronic 2, H411 | - |
| 2-hydroxyethyl acrylate | 818-61-1 | 607-072-00-8 | 212-454-9 | <0.19 | Acute Tox. 4, H302 Acute Tox. 3, H311 Skin Corr. 1B, H314 Skin Sens. 1, H317 Eye Dam. 1, H318 Aquatic Chronic 1, H410 Aquatic Chronic 3, H412 | ATE (oral)=548 mg/kg ATE (dermal)=298 mg/kg Skin Sens. 1, H317; C≥0.2% M=1 |
| Diphenyl (2,4,6-trimethyl benzoyl) phosphine oxide | 75980-60-8 | 015-203-00.X | 278-355-8 | 0.07 | Skin Sens. 1B, H317 Repr. 1B H360Fd Aquatic Chronic 2, H411 | - |

FIG. 16

| Ingredients: | | | | | | |
|---|---|---|---|---|---|---|
| Substance | CAS No. | Index No. | EC No. | w/w, % | CLP Classification | SCL/M-factor/ATE |
| 20AX UV Gel (10% Liquid) | | | | | | |
| Ethoxylayed (10) bisphenol a diacrylate | 64401-02-1 | - | - | 52.1 | None | - |
| Hexane, 1,6-diisocyanato-, homopolymer, 2-hydroxyethylacrylate- and propylene glycol monoacrylate-blocked | 1392411-89-0 | - | - | 25 | None | - |
| Poly(oxy-1,4-butanediyl), .alpha.-hydro-.omega.-hydroxy-, polymer with5-isocyanato-1-(isocyanatomethyl)-1,3,3-trimethylcyclohexane, 2-hydroxyethylacrylate-blocked | 82339-25-1 | - | - | 20 | None | - |
| Hydroxy cyclohexyl phenol ketone | 947-19-3 | - | 213-426-9 | 1.9 | None | - |
| Acid Blue 9 | 3844-45-9 | - | 223-339-8 | 0.5 | None | - |
| Red 40 | 25956-17-6 | - | 247-368-0 | 0.5 | None | - |
| Acid Red 27 | 915-67-3 | - | 213-022-2 | 0.5 | None | - |
| Acid Yellow 23 | 1934-21-0 | - | 217-699-5 | 0.5 | None | - |
| Food Yellow 3 | 2783-94-0 | - | 220-491-7 | 0.5 | None | - |
| Black catechu | 8001-76-1 | - | 232-291-7 | 0.5 | Flam. Liq. 2, H225 | - |
| Ethyl trimethylbenzoyl phenylphosphinate | 84434-11-7 | - | 282-810-6 | 0.43 | Skin Sens. 1B, H317 Aquatic Chronic 2, H411 | - |
| 2-hydroxyethyl acrylate | 818-61-1 | 607-072-00-8 | 212-454-9 | <0.19 | Acute Tox. 4, H302 Acute Tox. 3, H311 Skin Corr. 1B, H314 Skin Sens. 1, H317 Eye Dam. 1, H318 Aquatic Chronic 1, H410 Aquatic Chronic 3, H412 | ATE (oral)=548 mg/kg ATE (dermal)=298 mg/kg Skin Sens. 1, H317; C≥0.2% M=1 |
| Diphenyl (2,4,6-trimethyl benzoyl) phosphine oxide | 75980-60-8 | 015-203-00.X | 278-355-8 | 0.07 | Skin Sens. 1B, H317 Repr. 1B H360Fd Aquatic Chronic 2, H411 | - |

*FIG. 17*

RESINS FOR USE IN TOYS AND METHODS OF MAKING THE SAME

FIELD OF THE INVENTIONS

The present invention relates to a resin for use with Do-it-Yourself (DIY) toys and collectibles and methods of making those resins.

BACKGROUND OF THE INVENTIONS

Do-It-Yourself (DIY) toys and collectibles are frequently used to construct models of real-life objects or toys. Some of these DIY toys include a resin with properties that allow the resin to simulate real items. For example, U.S. Pat. No. 11,992,786 (hereinafter "'786 Patent") discloses a resin that exhibits properties that allows the resin to simulate food or beverage items.

Although the '786 Patent discloses the need for various viscosity resins to simulate different food or beverage items, Applicant of this patent application found that the original resins used by the '786 Patent were not ideal. Accordingly, Applicant moved forward to develop a new formula for a new series of resins that would have improved properties and performance over the existing resins used in DIY toy collectibles like the ones taught in the '786 Patent.

SUMMARY OF PREFERRED EMBODIMENTS

Resins for use in toys and toy kits and methods for making the same are provided. The amount of the various components may be adjusted to create different viscosities that support different play patterns. In preferred embodiments, a resin for use in toy kits is provided comprising. 30% to 55% w/w of Ethoxylated (10) Bisphenol A Diacrylate; 20% to 35% w/w of 1,3-Hexanediol, 2-ethyl-, polymer with 1,6-diisocyanatohexane, 2-hydroxyethyl acrylate- and propylene glycol monoacrylate-blocked; 20% to 30% w/w of Hexanedioic acid, polymer with 1,2-ethanediol and 5-isocyanato-1-(isocyanatometheyl)-1,3,3-trimethylcyclohexane, 2-hydroxyethyl acrylate-blocked; 1.9%±0.5% w/w of 1-Hydroxycyclohexyl phenyl ketone; 0.43%±0.05% of Ethyl trimethylbenzoyl phenylphosphinate; 0.07±0.05% w/w of Diphenyl (2, 4, 6-trimethyl benzoyl) phosphine oxide; and less than 0.19% w/w of 2-hydroxyethyl acrylate.

In some embodiments, the Ethoxylated (10) Bisphenol A Diacrylate is 40% to 50% w/w. In some embodiments, the 1,3-Hexanediol, 2-ethyl-, polymer with 1,6-diisocyanatohexane, 2-hydroxyethyl acrylate- and propylene glycol monoacrylate-blocked is 20% to 25% w/w. In some embodiments, the Hexanedioic acid, polymer with 1,2-ethanediol and 5-isocyanato-1-(isocyanatometheyl)-1,3,3-trimethylcyclohexane, 2-hydroxyethyl acrylate-blocked is 20% to 25% w/w.

In some embodiments, silicon dioxide may be added. In preferred embodiments, 1%-5% w/w silicon dioxide is added and the Ethoxylated (10) Bisphenol A Diacrylate is present at 30% to 35% w/w. In some embodiments, the 1,3-Hexanediol, 2-ethyl-, polymer with 1,6-diisocyanatohexane, 2-hydroxyethyl acrylate- and propylene glycol monoacrylate-blocked is 30% to 35% w/w. In some embodiments, the 1,3-Hexanediol, 2-ethyl-, polymer with 1,6-diisocyanatohexane, 2-hydroxyethyl acrylate- and propylene glycol monoacrylate-blocked is 25% to 30% w/w.

In yet other embodiments, the resin of claim 1, further comprising 5%-9% silicon dioxide and the Ethoxylated (10) Bisphenol A Diacrylate is present at 30% to 35% w/w. In some embodiments, the 1,3-Hexanediol, 2-ethyl-, polymer with 1,6-diisocyanatohexane, 2-hydroxyethyl acrylate- and propylene glycol monoacrylate-blocked is 25% to 30% w/w. In some embodiments, the 1,3-Hexanediol, 2-ethyl-, polymer with 1,6-diisocyanatohexane, 2-hydroxyethyl acrylate- and propylene glycol monoacrylate-blocked is 25% to 30% w/w.

In some preferred embodiments, the Ethoxylated (10) Bisphenol A Diacrylate is 45% to 55% w/w. In some embodiments, the 1,3-Hexanediol, 2-ethyl-, polymer with 1,6-diisocyanatohexane, 2-hydroxyethyl acrylate- and propylene glycol monoacrylate-blocked is 20% to 25% w/w. In some embodiments, the Hexanedioic acid, polymer with 1,2-ethanediol and 5-isocyanato-1-(isocyanatometheyl)-1,3,3-trimethylcyclohexane, 2-hydroxyethyl acrylate-blocked is 20% to 25% w/w.

In yet another embodiment of a resin for use in toys and toy kits, the resin comprises 27.6% to 52.1% w/w of Ethoxylated (10) Bisphenol A Diacrylate; 24.75% to 34.7% w/w of Hexane, 1,6-diisocyanato-, homopolymer, 2-hydroxyethyl acrylate and propylene glycol monoacrylate-blocked; 24.75% to 29.8% w/w of Poly(oxy-1,4-butanediyl), .alpha.-hydro-.omega.-hydroxy-, polymer with 5-isocyanato-1-(isocyanatomethyl)-1,3,3-trimethylcyclohexane, 2-hydroxyethylacrylate blocked; 1.9%±0.5% w/w of 1-Hydroxycyclohexyl phenyl ketone; 0.43%±0.05% w/w of Ethyl trimethylbenzoyl phenylphosphinate; 0.07±0.05% w/w of Diphenyl (2, 4, 6-trimethyl benzoyl) phosphine oxide; and less than 0.19% w/w of 2-hydroxyethyl acrylate.

In some embodiments, the Ethoxylated (10) Bisphenol A Diacrylate is 47.6%±1% w/w of the resin. In some embodiments, the Hexane, 1,6-diisocyanato-, homopolymer, 2-hydroxyethyl acrylate and propylene glycol monoacrylate-blocked is 24.75%±1% w/w of the resin. In some embodiments, the Poly(oxy-1,4-butanediyl), .alpha.-hydro-.omega.-hydroxy-, polymer with 5-isocyanato-1-(isocyanatomethyl)-1,3,3-trimethylcyclohexane, 2-hydroxyethylacrylate blocked is 24.75%±1% w/w of the resin.

In some embodiments, the Ethoxylated (10) Bisphenol A Diacrylate is 52.1%±1% w/w of the resin. In some embodiments, the Hexane, 1,6-diisocyanato-, homopolymer, 2-hydroxyethyl acrylate and propylene glycol monoacrylate-blocked is 25%±1% w/w of the resin. In some embodiments, the Poly(oxy-1,4-butanediyl), .alpha.-hydro-.omega.-hydroxy-, polymer with 5-isocyanato-1-(isocyanatomethyl)-1,3,3-trimethylcyclohexane, 2-hydroxyethylacrylate blocked is 20%±1% w/w of the resin.

In some embodiments, silicon dioxide is added. In embodiments with silicon dioxide, 1.2%±0.5% w/w silicone dioxide may be present and the Ethoxylated (10) Bisphenol A Diacrylate is 31.4%±1% w/w of the resin. In some of those embodiments, the Hexane, 1,6-diisocyanato-, homopolymer, 2-hydroxyethyl acrylate and propylene glycol monoacrylate-blocked is 34.7%±1% w/w of the resin. In some embodiments, the Poly(oxy-1,4-butanediyl), .alpha.-hydro-.omega.-hydroxy-, polymer with 5-isocyanato-1-(isocyanatomethyl)-1,3,3-trimethylcyclohexane, 2-hydroxyethylacrylate blocked is 29.8%±1% w/w of the resin.

In still yet another embodiment with silicon dioxide, the resin may have 6%±1% w/w silicone dioxide and the Ethoxylated (10) Bisphenol A Diacrylate is 27.6%±1% w/w of the resin. In some embodiments, the Hexane, 1,6-diisocyanato-, homopolymer, 2-hydroxyethyl acrylate and propylene glycol monoacrylate-blocked is 33.7%±1% w/w of the resin. In yet other embodiments, the Poly(oxy-1,4-butanediyl), .alpha.-hydro-.omega.-hydroxy-, polymer with 5-isocyanato-1-(isocyanatomethyl)-1,3,3-trimethylcyclo-hexane, 2-hydroxyethylacrylate blocked is 29.8%±1% w/w of the resin.

BRIEF DESCRIPTION OF THE DRAWINGS

FIG. 1 illustrates a table showing the component makeup of one embodiment of the resins taught herein;—20B Gel Liquid FIG. 2 illustrates the chemical structure of Ethoxylated (10) Bisphenol A Diacrylate (CAS No. 64401-02-1)—Polymer 1;

FIG. 3 illustrates the chemical structure of Hexanedioic acid, polymer with 1,2-ethanediol and 5-isocyanato-1-(iso-cyanatometheyl)-1,3,3-trimethylcyclohexane, 2-hydroxy-ethyl acrylate-blocked (CAS No. 71549-84-3)—Polymer 3;

FIG. 4 illustrates the chemical structure of 1-Hydroxycy-clohexyl phenyl ketone (CAS No. 947-19-3)—Polymer 4;

FIG. 5 illustrates the chemical structure of Ethyl trimeth-ylbenzoyl phenylphosphinate (CAS No. 84434-11-7)—Polymer 5;

FIG. 6 illustrates the chemical structure of Diphenyl (2, 4, 6-trimethyl benzoyl) phosphine oxide (CAS No. 75980-60-8)—Polymer 7;

FIG. 7 illustrates a table showing the component makeup of one embodiment of the resins taught herein—20B Gel Glaze;

FIG. 8 illustrates the chemical structure of silicon dioxide (CAS No. 7631-86-9)—Polymer 8;

FIG. 9 illustrates a table showing the component makeup of one embodiment of the resins taught herein—20B Thick Gel;

FIG. 10 illustrates a table showing the component makeup of one embodiment of the resins taught herein—20B Gel 10% Liquid;

FIG. 11 illustrates a table showing the component makeup of one embodiment of the resins taught herein—20B Super-thin;

FIG. 12 illustrates the chemical structure of PEG-22 Dimethacrylate (CAS No. 25852-47-5)—Polymer 9;

FIG. 13 illustrates a table showing the component makeup of one embodiment of the resins taught herein—20A Super-thin;

FIG. 14 illustrates a table showing the component makeup of one embodiment of the resins taught herein—20A Gel Liquid;

FIG. 15 illustrates a table showing the component makeup of one embodiment of the resins taught herein—20A Glaze;

FIG. 16 illustrates a table showing the component makeup of one embodiment of the resins taught herein—20A Thick Gel;

FIG. 17 illustrates a table showing the component makeup of one embodiment of the resins taught herein—20A 10% Liquid;

DETAILED DESCRIPTION OF THE DRAWINGS

The embodiments of resins hereinafter described are the embodiments preferred at this time, and are not intended to and should not be interpreted to limit the scope of protection provided by this patent. Many modifications to the embodiments of resins taught and described herein are possible without departing from the inventive concepts disclosed, depicted and claimed, and terms that are used for various aspects and components of the preferred embodiments are not limiting.

Whenever component percentages are used herein, they are referring to weight to weight (w/w), which is the total mass of the component compared to the total mass of the mixture or solution. If no tolerance is given for a particular value, it should be assumed that the tolerance is plus or minus five times the least significant digit. So X.X % would have a tolerance of plus or minus 0.5%.

In a first preferred embodiment, a polymeric mixture is provided that creates a resin that is curable in ultra-violet light and may be used safely in toys and in particular, toys for children. The play patterns envisioned include using the resin in miniature product creation toys such as miniature food products, clothing items, consumer goods and other miniature products. However, the mixture may be used in numerous different play patterns and for other types of toy products.

The first embodiment of the resin may be produced in different viscosities including but not limited to, Liquid, Glaze, Thick, 10% liquid and superthin. Each embodiment includes the same general components in different ratios however, there may be additional elements in some embodi-ments. Different viscosities allow for different play patterns within the final toy. For example, if it is desired to product an icing for a cake, glaze may be used. If the product requires something more liquid, Superthin may be used.

FIG. 1 illustrates a table showing the component makeup of the "liquid" embodiment of the resins taught herein. A detailed explanation of the components will be provided for the liquid embodiment and the other embodiments will be described in table form after the full description of the liquid embodiment. One skilled in the art will understand that numerous other embodiments are possible by varying the quantities within the ranges taught herein.

In the liquid embodiment, the resins first component, making up 40% to 50% of the mass, is ethoxylated (10) bisphenol A diacrylate (CAS No. 64401-02-1) (hereinafter "Polymer 1"). Polymer 1 is a multifunctional acrylate mono-mer and may be used in UV-curable formulations. It is known for its excellent chemical resistance, high crosslink-ing density, and enhanced flexibility. Due to its ethoxylation, this compound exhibits improved compatibility with various resins and lower viscosity, making it easier to process in different applications.

FIG. 2 illustrates the chemical structure of Polymer 1. Polymer 1 consists of a bisphenol A core modified with approximately 10 ethylene oxide units per molecule, capped with acrylate functional groups. This structure enhances its reactivity in free-radical polymerization processes, particu-larly in UV and electron beam (EB) curing systems. Ethoxy-lated (10) Bisphenol A Diacrylate has a chemical formula: $C_{54}H_{68}O_{14}$ with a molecular weight: ~925 g/mol (varies slightly due to ethoxylation distribution). It is a clear to slightly yellow viscous liquid with moderate to high viscos-ity, depending on temperature and degree of ethoxylation. Polymer 1 has limited solubility in water but is soluble in many organic solvents. A key property for the play patterns described herein is that it polymerizes upon exposure to Ultraviolet (UV) or Electron Beam (EB) radiation, forming a highly crosslinked network with excellent mechanical and chemical resistance. Accordingly, it may be used as a UV-curable coating, where it imparts toughness, flexibility, and chemical resistance.

Although the preferred embodiment uses 40%-50% of Polymer 1, other embodiments may use other percentages depending on the desired effect. Depending on the embodiment, 30%-69.5% Polymer 1 may be used. In yet other embodiments, 30%-35%, 45%-55% or 50%-69.5% of Polymer 1 may be used.

The concentration of Polymer 1 in the resin formulations directly influences their mechanical and chemical properties. Higher concentrations (69.5%) promote greater crosslinking density, enhancing curing speed, thermal stability, and bond strength while potentially increasing rigidity. Lower concentrations (30%) improve flexibility and impact resistance but may reduce structural integrity and chemical resistance. Optimal formulation requires careful balancing to achieve desired performance characteristics, with structural applications typically requiring higher Polymer 1 content and flexible applications benefiting from reduced proportions. Supplementary modifiers may be necessary to adjust viscosity and mitigate shrinkage effects.

In addition to Polymer 1, preferred embodiments of the resin contain 1,3-Hexanediol, 2-ethyl-, polymer with 1,6-diisocyanatohexane, 2-hydroxyethyl acrylate- and propylene glycol monoacrylate-blocked (CAS No. 266692-50-6) in a range of 20%-25% w/w (hereinafter "Polymer 2"). Polymer 2 is a urethane acrylate oligomer commonly used in high-performance coatings, adhesives, and UV/EB-curable formulations. It provides excellent mechanical properties, chemical resistance, and flexibility, making it suitable for industrial applications requiring durability and adhesion.

Polymer 2 is formed by the reaction of 1,3-hexanediol, 2-ethyl-(a diol) with 1,6-diisocyanatohexane (HDI), and functionalized with 2-hydroxyethyl acrylate (2-HEA) and propylene glycol monoacrylate (PGMA). The presence of acrylate groups allows for rapid curing under UV or EB radiation, while the urethane backbone contributes to toughness, flexibility, and resistance to chemicals and wear.

Although the liquid embodiment uses 20%-25% of Polymer 2, other embodiments may use other percentages depending on the desired effect. In different embodiments, 10%-35% of Polymer 2 may be used. In particular embodiments, 30%-35%, 25%-30%, 20%-25% or 10%-20% of Polymer 2 may be used.

The concentration ratio of Polymer 2 in resin formulations influences performance properties. Increasing HDI enhances crosslinking, improving rigidity, chemical resistance, and thermal stability but may reduce flexibility and increase curing time. Higher 2-HEA content accelerates UV/radical curing and increases hardness but can lead to brittleness. A balanced ratio enables tuneable adhesion, combining the strength of HDI with the rapid cure of 2-HEA, making it suitable for applications ranging from flexible sealants to high-performance structural adhesives. Controlling 2-HEA residues ensure product performance, long-term stability, and safety compliance. To achieve the desired performance characteristics, it is crucial to carefully balance these components according to the specific manufacture procedure hereinafter.

In addition to Polymers 1 and 2, preferred embodiments of the resin may contain Hexanedioic acid, polymer with 1,2-ethanediol and 5-isocyanato-1-(isocyanatometheyl)-1,3,3-trimethylcyclohexane, 2-hydroxyethyl acrylate-blocked (CAS No. 71549-84-3) in a range of 20%-25% w/w (hereinafter "Polymer 3"). However, it should be noted that the "Gel Superthin" embodiment does not contain Polymer 3.

FIG. 3 illustrates the chemical structure of Polymer 3. Polymer 3 is a urethane acrylate polymer designed for UV or EB-curable coatings, adhesives, and advanced material applications. This polymer features a combination of polyester and urethane chemistry, offering a balance of flexibility, durability, and chemical resistance, making it suitable for high-performance coatings and surface protection applications.

Although the preferred embodiment uses 20%-25% Polymer 3, other embodiments may use other percentages depending on the desired effect. Depending on the embodiment, 0%-30% of Polymer 3 may be used. In yet other embodiments, 25%-30% or 20%-25% may be used. As mentioned, in some embodiments, no Polymer 3 may be used.

Increasing Polymer 3 concentration boosts adhesion, flexibility, and viscosity but may reduce curing speed and workability, while decreasing Polymer 3 improves flow and faster curing but weakens bond strength and durability. The optimal concentration balances these properties for specific needs, such as flexible coatings or rigid, high-strength adhesives. Adjusting Polymer 3 levels allows customization of viscosity, tackiness, and UV reactivity in the final adhesive formulation.

In addition to the main polymers 1-3, preferred embodiments of the resin contain hydroxy cyclohexyl phenyl ketone (CAS No. 947-19-3) at 1.9%±0.05% w/w (hereinafter "Polymer 4"). Polymer 4 is a photoinitiator that enables the curing process when exposed to UV light. FIG. 4 illustrates the chemical structure of Polymer 4.

Although the preferred embodiment uses 1.9%±0.05% w/w of Polymer 4, other embodiments may use other percentages depending on the desired effect. In some embodiments, 0.1%-3% of the mass of the resin may be made up of Polymer 4. In yet other embodiments, 0.1%-4% of the mass of the resin may be made up of Polymer 4.

The concentration of HCPK in UV-curable formulations critically influences curing kinetics, mechanical properties, and optical clarity. Higher concentrations (4 wt %) enhance polymerization speed and crosslinking density but may induce brittleness or discoloration, while lower concentrations (0.1 wt %) improve flexibility at the risk of incomplete curing. Optimal performance is achieved by balancing cure depth, oxygen inhibition resistance, and cost efficiency, typically within 1-3 wt % for most applications. Adjustments should account for UV intensity, film thickness, and desired material characteristics.

In addition to Polymers 1-4, preferred embodiments of the resin contain Ethyl trimethylbenzoyl phenylphosphinate (CAS No. 84434-11-7) at 0.43%±0.05% w/w (hereinafter "Polymer 5"). FIG. 5 illustrates the chemical formula for Polymer 5. Polymer 5 is a highly efficient photo-initiator used in UV-curable products. Polymer 5 is known for its excellent solubility, low yellowing properties, and strong absorption in the UV range, making it suitable for high-performance applications requiring fast and deep curing. Polymer 5 has a Chemical Formula: $C_{18}H_{21}O_3P$ and a molecular weight: ~316.33 g/mol.

Although the preferred embodiment uses 0.43%±0.05% w/w of Polymer 5, other embodiments may use other percentages depending on the desired effect. In some embodiments, 0.2%-0.8% of the mass of the resin may be made up of Polymer 5. In yet other embodiments, 0.2%-1% of the mass of the resin may be made up of Polymer 5.

Polymer 5 is an efficient Type I photoinitiator with superior solubility and deep-cure performance, particularly effective under 395-405 nm UV-LED light. The concentration of Polymer 5 significantly impacts curing kinetics, with 0.2-1 wt % typically providing optimal polymerization speed while minimizing yellowing and migration risks. The amount of Polymer 5 demonstrates a favorable balance between reactivity and safety, though excessive concentrations (>1 wt %) may compromise material properties through over-initiation.

Figure 6:
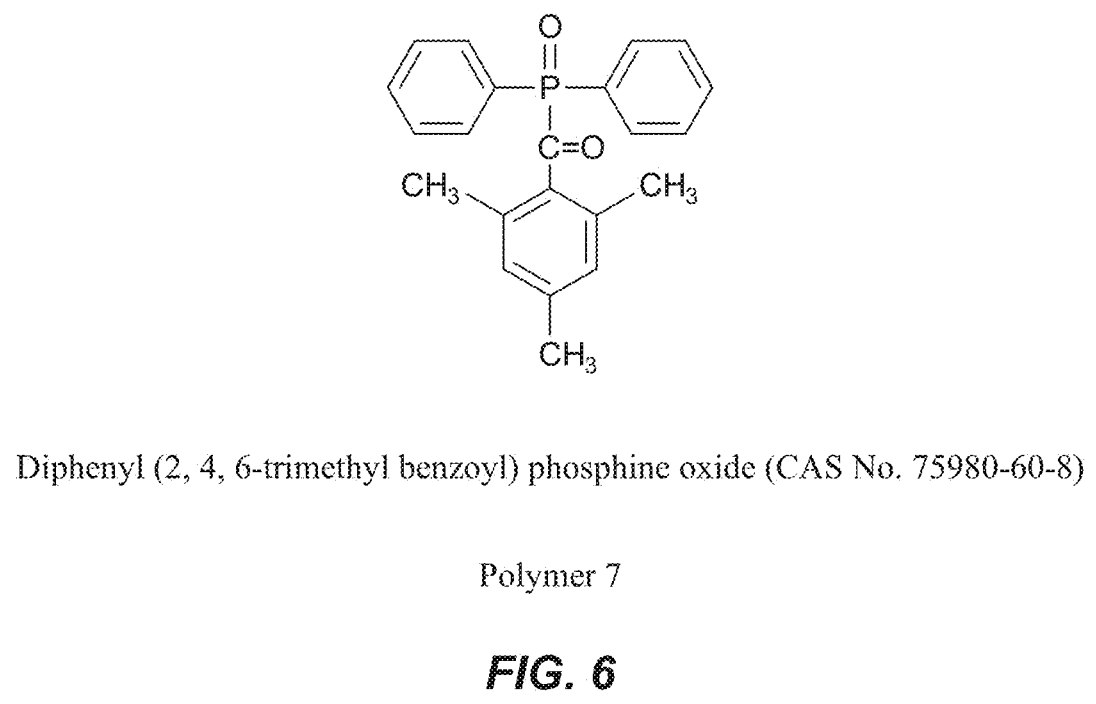

In addition to Polymers 1-5, preferred embodiments of the resin contain Diphenyl (2, 4, 6-trimethyl benzoyl) phosphine oxide (CAS No. 75980-60-8) at 0.07%±0.05% w/w (hereinafter "Polymer 7"). FIG. 6 illustrates the chemical formula for Polymer 7. Polymer 7, commonly known as TPO (Trimethylbenzoyl Diphenylphosphine Oxide), is a highly effective Type I photoinitiator used for its UV-curable properties. It has excellent deep curing ability, low yellowing, and strong absorption in the UV spectrum. It has a chemical formula of $C_{22}H_{21}O_2P$ and a molecular weight: ~348.38 g/mol.

Although the preferred embodiment uses 0.07%±0.05% w/w of Polymer 7, other embodiments may use other percentages depending on the desired effect. In some embodiments, 0.01%-0.08% of the mass of the resin may be made up of Polymer 7. In yet other embodiments, 0.01%-1% of the mass of the resin may be made up of Polymer 7.

The concentration of Polymer 7 in UV-curable formulations influences polymerization kinetics and material properties. Higher concentrations enhance curing speed and depth penetration, particularly in pigmented or thick systems, while lower concentrations suffice for clear, thin films. Optimal performance is achieved by balancing radical generation and safety requirements, typically within 0.01-0.08 wt % for most applications, often in synergy with other photoinitiators for broad-spectrum efficacy.

Figure 8:
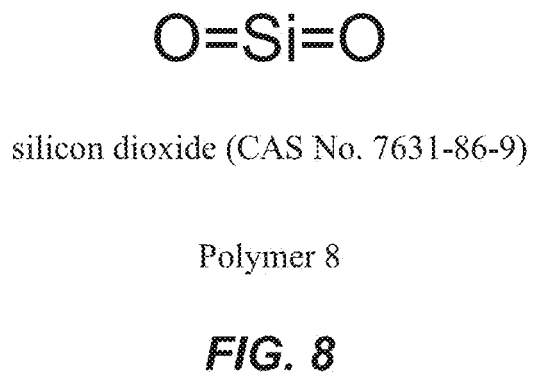

As one skilled in the art may appreciate, while not a required component, the resin formula may also include various coloring agents, each present in minimal concentrations ranging from 0.02% to 0.5% of the total mass of the resin. The coloring agents may serve various purposes. In one embodiment, different versions of the resin may be colored differently in order to allow them to be easily identified after composition. Accordingly, different color resins may exhibit slightly different properties, for example, nent of silicone dioxide (CAS No. 7631-86-9) (hereinafter "Polymer 8"). Silicon dioxide is a commonly known compound and its chemical formula is Shown in FIG. 8. In the Glaze embodiment, silicone dioxide is present in the range of 1%-5%. However, depending on the embodiment, silicone dioxide may be present in the range of 1%-9%. As will be explained in more detail with respect to the "thick gel" embodiment below, in at least one other embodiment, silicone dioxide is present in the range of 5%-9%.

FIG. 9 illustrates a table showing the component makeup of the "Thick Gel" embodiment of the resin taught herein. The Thick Gel embodiment has all the same components as the Glaze embodiment, some of them in different quantities. However, the Thick Gel embodiment has a higher concentration of silicone dioxide than the Glaze embodiment. Silicon dioxide is found in the Thick Gel embodiment at a ratio of 5%-9%.

FIG. 10 illustrates a table showing the component makeup of the "10% Liquid Gel" embodiment of the resin taught herein. The 10% Liquid Gel embodiment has all the same components as the Liquid embodiment, some of them in different quantities.

FIG. 11 illustrates a table showing the component makeup of the "Super Thin Gel" embodiment of the resin taught herein. The Super Thin Gel embodiment has all the same components as the Liquid embodiment, some of them in different quantities, however, the Super Thin Gel does not have any of Polymer 3 and adds 2%-9% of PEGG-22 Dimethacrylate (CAS No. 25852-47-5) (hereinafter Polymer 9).

Figure 12:
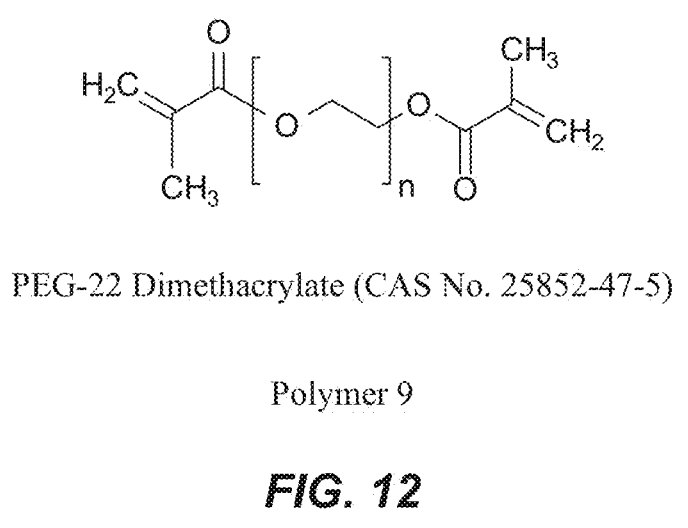

FIG. 12 illustrates the chemical structure of PEG-22 Dimethacrylate (CAS No. 25852-47-5) (hereinafter "Polymer 9"). PEG-22 Dimethacrylate enhances the resin's flexibility and impact resistance, while also improving its adhesion properties.

Table 1 below shows the various example embodiments taught herein and their component ratios.

TABLE 1

| 20B | Polymer 1 | Polymer 2 | Polymer 3 | Polymer 4 | Polymer 5 | Polymer 7 | Polymer 8 | Polymer 9 |
|---|---|---|---|---|---|---|---|---|
| Liquid | 40%-50% | 20%-25% | 20%-25% | 1.9% ± 0.5 | 0.43% ± 0.05 | 0.07% ± 0.05 | 0% | 0% |
| Glaze | 30%-35% | 30%-35% | 25%-30% | 1.9% ± 0.5 | 0.43% ± 0.05 | 0.07% ± 0.05 | 1%-5% | 0% |
| Gel Thick | 30%-35% | 25%-30% | 25%-30% | 1.9% ± 0.5 | 0.43% ± 0.05 | 0.07% ± 0.05 | 5%-9% | 0% |
| Gel 10% Liquid | 45%-55% | 20%-25% | 20%-25% | 1.9% ± 0.5 | 0.43% ± 0.05 | 0.07% ± 0.05 | 0% | 0% |
| Gel Superthin | 50%-69.5% | 10%-20% | 0% | 1.9% ± 0.5 | 0.43% ± 0.05 | 0.07% ± 0.05 | 0% | 2%-9% | viscosity. In yet other embodiments, the coloring agents impart specific visual characteristics to the cured product.

Any coloring agents or combinations of coloring agents may be used including but not limited to Acid Blue 9, Red 40, Acid Red 27, Acid Yellow 23, and Food Yellow 3. Although these pigments are only minor constituents, they may play a significant role in defining the aesthetic qualities of the final material FIG. 7 illustrates a table showing the component makeup of the "Glaze" embodiment of the resins taught herein. The glaze embodiment has all the same components as the "Liquid" embodiment, some of them in different quantities. However, the Glaze embodiment has the addition compo- In yet another embodiment of the resin, a Superthin UV Resin with a slightly different composition is provided. FIG. 13 illustrates a table showing the component makeup of the "20A Superthin" embodiment of the resin taught herein.

In the 20A Superthin embodiment, the resin's first component, making up 69.5% or less of the mass of the resin, is Polymer 1. (See FIG. 2).

The second component, making up 20%±1%, is Hexane, 1,6-diisocyanato-, homopolymer, 2-hydroxyethyl acrylate and propylene glycol monoacrylate-blocked. (CAS No. 1392411-89-0) (hereinafter "Polymer 10").

In addition to Polymer 1 and Polymer 10, the 20A Superthin embodiment contains 7.6%±1% of Polymer 9. (See FIG. 13).

In addition to Polymers 1, 9 and 10, the 20A Superthin resin contains 1.9%±0.5% of Polymer 4. (See FIG. 4).

In addition to Polymers, 1, 4, 9 and 10, the 20A Superthin embodiment contains 0.43%±0.05% of Polymer 5. (See FIG. 5).

In addition to Polymers, 1, 4, 5, 9 and 10, the 20A Superthin embodiment contains <0.07%±0.05% of Polymer 7. (See FIG. 6).

As one skilled in the art may appreciate, and has already been discussed with respect to other embodiments described herein, while not a required component, the resin formula may also include various coloring agents, each present in minimal concentrations ranging from 0.02% to 0.5% of the total mass of the resin.

Other embodiments of the resin for use in toy play patterns are also possible. In other embodiments, similar components to the 20A Superthin embodiment may be used but with the addition of Poly(oxy-1,4-butanediyl), .alpha.-hydro-.omega.-hydroxy-, polymer with 5-isocyanato-1-(iso-cyanatomethyl)-1,3,3-trimethylcyclohexane, 2-hydroxy-ethylacrylate blocked (CAS No. 82339-25-1) (hereinafter "Polymer 11"). Polymer 11 is a urethane acrylate polymer that combines flexibility, toughness, and chemical resistance. It offers excellent mechanical properties and low shrinkage during curing.

Table 2 below described some additional embodiments similar to the 20A Superthin embodiment.

40, Acid Red 27, Acid Yellow 23, and Food Yellow 3. Although these pigments are only minor constituents, they may play a significant role in defining the aesthetic qualities of the final material.

The composition of a plurality of resin embodiments has been disclosed above. With respect to creating these embodiments, the general process will now be described.

The process of creating the resins described herein begins with raw material preparation, which includes acrylate monomer, acrylic resin, any photoinitiators, fillers, and pigments. Before production, all containers, pipes, utensils, dispersion cylinders, and dispersion machine blades must be thoroughly cleaned using anhydrous ethanol, followed by a drying period of 20 minutes to allow for complete evaporation.

In the pre-mixing stage, the monomer and photoinitiator are added to a mixing container in the required formula proportions. A low-speed stirrer is used to ensure the preliminary dispersion of these components. The temperature is then raised to 65° C. and maintained for 20 minutes to observe the solid initiator. Mixing continues for a duration of 10 to 30 minutes, with the specific time adjusted based on the formulation and equipment used.

Next, the dispersal and grinding process begins. The pre-mixed material is transferred to a high-speed dispersion machine, where acrylic resin and fillers are incorporated. The mixture is dispersed at high speed for 30 minutes while

TABLE 2

| 20A | Polymer 1 | Polymer 4 | Polymer 5 | Polymer 7 | Polymer 8 | Polymer 9 | Polymer 10 | Polymer 11 |
|---|---|---|---|---|---|---|---|---|
| 20A Superthin | 69.5% | 1.9% ± 0.5 | 0.43% ± 0.05 | 0.07% ± 0.05% | 0% | 7.6% ± 0.5% | 20% ± 1% | 0% |
| 20A Gel Liquid | 47.6% | 1.9% ± 0.5 | 0.43% ± 0.05 | 0.07% ± 0.05% | 0% | 0% | 24.75% ± 1% | 24.75% ± 1% |
| 20A Gel Glaze | 31.4% | 1.9% ± 0.5 | 0.43% ± 0.05 | 0.07% ± 0.05% | 1.2% ± 0.05% | 0% | 34.7% ± 1% | 29.8% ± 1% |
| 20A Gel Thick | 27.6% | 1.9% ± 0.5 | 0.43% ± 0.05 | 0.07% ± 0.05% | 6% ± 1 | 0% | 33.7% ± 1% | 29.8% ± 1% |
| 20A Gel 10% Liquid | 52.1% | 1.9% ± 0.5 | 0.43% ± 0.05 | 0.07% ± 0.05% | 0% | 0% | 25% ± 1% | 20% ± 1 |

FIGS. 15, 16, 17 and 18 show the component makeups of the 20A Gel Liquid, 20A Gel Glaze, 20A Gel Thick and 20A Gel 10% Liquid from Table 2 above respectively. Although a number of embodiments have been provided in Table 2, one skilled in the art will appreciate these are exemplary and other embodiments may be created using the components described herein using different weight percentages and ranges of weights to create slightly different viscosity final products, particularly within the bounds of the ranges of the various embodiments provided.

As one skilled in the art may appreciate, while not a required component, the resin formulas disclosed herein may also include various coloring agents, each present in minimal concentrations ranging from 0.02% to 0.05% of the total mass of the resin. The coloring agents may server various purposes. In one embodiment, different versions of the resin may be colored differently in order to allow them to be easily identified after composition. Accordingly, different color resins may exhibit slightly different properties, for example, viscosity. In yet other embodiments, the coloring agents impart specific visual characteristics to the cured product.

Any coloring agents or combinations of coloring agents may be used including but not limited to Acid Blue 9, Red monitoring and ensuring the temperature remains below 60° C. to prevent any unwanted reactions. It is important to make sure there is no agglomeration caused by high-speed shear mixing. Following this, the mixture undergoes grinding using a three-roll mill, passing through twice to achieve the required particle fineness, which should be below 10 microns.

If color is required, it is preferably added next. In the color tuning process, the appropriate color slurry is added according to the specified formulation. The mixture is dispersed at a low speed for 20 minutes to achieve uniform color distribution.

Once the desired color is achieved, the mixture moves to the filtration stage. Here, the mixed UV gel is filtered using a screen or filter bag, typically with an accuracy of 5 to 20 microns, to remove undispersed particles and impurities. The filtered UV gel should be completely free of visible impurities.

Degassing follows, where the filtered UV gel is transferred to a vacuum degassing device and subjected to a vacuum level of −0.08 to −0.1 MPa for a period of 10 to 30 minutes. This step is crucial as it significantly enhances the fluency and stability of the final product by removing trapped air bubbles.

Quality control is then performed through several tests, including viscosity testing using a viscometer to ensure proper flow properties, a curing speed test under standard UV light intensity, a color plate contrast test to verify color accuracy, and a stability test in which the UV gel is stored under high or low temperatures to observe performance changes.

Once the quality checks are completed, the packaging process begins. The degassed UV gel is filled into dark containers, such as brown or black plastic bottles or metal cans, which are tightly sealed to prevent air from entering and causing oxidation or pre-curing. During packaging, exposure to strong light, especially UV light, must be strictly avoided.

Storage and transportation of the UV gel requires careful handling. The resins should be stored in a dark, cool (10-25° C.), and dry environment. During transportation, it is essential to avoid high temperatures, strong light, and violent vibrations. The typical shelf life of the product is around 18 months, depending on the formulation and storage conditions.

Throughout the entire process, several key control points must be observed. The quality of raw materials must be ensured, with monomers and photoinitiators meeting purity and stability standards. Uniform mixing is critical to prevent localized concentrations of the photoinitiator, and temperature monitoring is necessary at all stages of dispersion. The degassing process must be thorough to eliminate bubbles that could lead to defects after curing. Additionally, careful light-proof packaging is required to prevent premature curing, and environmental controls must be maintained in the production workshop to minimize contamination from dust and impurities. Ensuring these factors guarantees a high-quality, stable, and effective UV gel formulation.

To ensure that the final substance compositions comply with safety and regulatory standards, the concentration of 2-hydroxyethyl acrylate (Polymer 6 See FIG. 6 or "2-HEA") must be maintained at or below 0.2% by mass. Accordingly, in some embodiments, a multi-step process that emphasizes precise monitoring and stringent control measures throughout production may be used.

An important first step to make sure 2-HEA remains at or below 0.2% is the selection of raw materials with minimal 2-HEA content. This may be accomplished through testing or verified through supplier certifications and quality assurance testing. The incoming materials should be tested to confirm that the initial concentration of 2-HEA is within acceptable limits.

During the polymerization or blending process, reaction parameters (e.g., temperature, pressure, catalyst type, and mixing speed) may be optimized to minimize the formation of 2-HEA. Solutions may be monitored and analyzed to detect any increases in 2-HEA concentration.

In some embodiments, in-line analytical techniques (e.g., gas chromatography, HPLC) may be used to measure 2-HEA content at critical stages of production. Ensure that any deviations are promptly corrected to maintain the concentration below 0.2% by mass.

In some embodiments, purification techniques such as distillation, vacuum stripping, or solvent extraction may be used to remove residual 2-HEA. Stabilizers or scavengers may be added to bind any trace 2-HEA, thereby reducing its free concentration in the final product.

After production, a final comprehensive analysis of the substance must be performed to confirm that the 2-HEA concentration does not exceed 0.2% by mass.

Although a number of different steps have been provided for controlling the 2-HEA, in various different embodiments, any combination of them may be used including only one of the steps or all of the steps. By following one or more of these steps, the production process can effectively limit the concentration of 2-hydroxyethyl acrylate, ensuring that the final substance is not classified as hazardous and meets all applicable regulatory requirements.

Overall, the resins described herein are carefully engineered materials designed to balance structural performance, processing behavior, and aesthetic appeal. The precise combination of polymers, curing agents, and additives ensures that it meets the specific requirements for its intended application.

While preferred embodiments of various aspects of the overall methods and systems have been described in detail above, it would be understood by a person skilled in the art that many modifications of and to the preferred embodiments can be made without departing from the inventive concepts herein described. Therefore, the above detailed description is not limiting, and the scope of the protection provided herein is based upon the claims set forth below.

What is claimed is:

1. A resin for use in toy kits comprising:
   30% to 55% w/w of Ethoxylated (10) Bisphenol A Diacrylate;
   20% to 35% w/w of 1,3-Hexanediol, 2-ethyl-, polymer with 1,6-diisocyanatohexane, 2-hydroxyethyl acrylate- and propylene glycol monoacrylate-blocked;
   20% to 30% w/w of Hexanedioic acid, polymer with 1,2-ethanediol and 5-isocyanato-1-(isocyanatometheyl)-1,3,3-trimethylcyclohexane, 2-hydroxyethyl acrylate-blocked;
   1.9%±0.5% w/w of 1-Hydroxycyclohexyl phenyl ketone;
   0.43%±0.05% w/w of Ethyl trimethylbenzoyl phenylphosphinate;
   0.07±0.05% w/w of Diphenyl (2, 4, 6-trimethyl benzoyl) phosphine oxide; and
   less than 0.19% w/w of 2-hydroxyethyl acrylate.

2. The resin of claim 1, wherein the Ethoxylated (10) Bisphenol A Diacrylate is 40% to 50% w/w.

3. The resin of claim 2, wherein the 1,3-Hexanediol, 2-ethyl-, polymer with 1,6-diisocyanatohexane, 2-hydroxyethyl acrylate- and propylene glycol monoacrylate-blocked is 20% to 25% w/w.

4. The resin of claim 3, wherein the Hexanedioic acid, polymer with 1,2-ethanediol and 5-isocyanato-1-(isocyanatometheyl)-1,3,3-trimethylcyclohexane, 2-hydroxyethyl acrylate-blocked is 20% to 25% w/w.

5. The resin of claim 1, further comprising 1%-5% silicon dioxide w/w and wherein the Ethoxylated (10) Bisphenol A Diacrylate is 30% to 35% w/w.

6. The resin of claim 5, wherein the 1,3-Hexanediol, 2-ethyl-, polymer with 1,6-diisocyanatohexane, 2-hydroxyethyl acrylate- and propylene glycol monoacrylate-blocked is 30% to 35% w/w.

7. The resin of claim 6, wherein the 1,3-Hexanediol, 2-ethyl-, polymer with 1,6-diisocyanatohexane, 2-hydroxyethyl acrylate- and propylene glycol monoacrylate-blocked is 25% to 30% w/w.

8. The resin of claim 1, further comprising 5%-9% silicon dioxide and wherein the Ethoxylated (10) Bisphenol A Diacrylate is 30% to 35% w/w.

9. The resin of claim 5, wherein the 1,3-Hexanediol, 2-ethyl-, polymer with 1,6-diisocyanatohexane, 2-hydroxyethyl acrylate- and propylene glycol monoacrylate-blocked is 25% to 30% w/w.

10. The resin of claim 6, wherein the 1,3-Hexanediol, 2-ethyl-, polymer with 1,6-diisocyanatohexane, 2-hydroxyethyl acrylate- and propylene glycol monoacrylate-blocked is 25% to 30% w/w.

11. The resin of claim 1, wherein the Ethoxylated (10) Bisphenol A Diacrylate is 45% to 55% w/w.

12. The resin of claim 2, wherein the 1,3-Hexanediol, 2-ethyl-, polymer with 1,6-diisocyanatohexane, 2-hydroxyethyl acrylate- and propylene glycol monoacrylate-blocked is 20% to 25% w/w.

13. The resin of claim 3, wherein the Hexanedioic acid, polymer with 1,2-ethanediol and 5-isocyanato-1-(isocyanatomethyl)-1,3,3-trimethylcyclohexane, 2-hydroxyethyl acrylate-blocked is 20% to 25% w/w.

14. A resin for use in toy kits comprising:

30% to 35% w/w of Ethoxylated (10) Bisphenol A Diacrylate;

25% to 35% w/w of 1,3-Hexanediol, 2-ethyl-, polymer with 1,6-diisocyanatohexane, 2-hydroxyethyl acrylate- and propylene glycol monoacrylate-blocked;

25% to 30% w/w of Hexanedioic acid, polymer with 1,2-ethanediol and 5-isocyanato-1-(isocyanatomethyl)-1,3,3-trimethylcyclohexane, 2-hydroxyethyl acrylate-blocked;

1.9%±0.5% w/w of 1-Hydroxycyclohexyl phenyl ketone;

0.43%±0.05% w/w of Ethyl trimethylbenzoyl phenylphosphinate;

0.07±0.05% w/w of Diphenyl (2, 4, 6-trimethyl benzoyl) phosphine oxide;

1%-9% w/w silicon dioxide;

and less than 0.19% w/w of 2-hydroxyethyl acrylate.

15. The resin of claim 14, wherein the 1,3-Hexanediol, 2-ethyl-, polymer with 1,6-diisocyanatohexane, 2-hydroxyethyl acrylate- and propylene glycol monoacrylate-blocked is 30% to 35% w/w.

16. The resin of claim 15, wherein the silicone dioxide is 1%-5% w/w of the resin.

17. The resin of claim 14, wherein the 1,3-Hexanediol, 2-ethyl-, polymer with 1,6-diisocyanatohexane, 2-hydroxyethyl acrylate- and propylene glycol monoacrylate-blocked is 25% to 30% w/w.

18. The resin of claim 15, wherein the silicone dioxide is 5%-9% w/w of the resin.

19. A resin for use in toy kits consisting essentially of:

40% to 50% w/w of Ethoxylated (10) Bisphenol A Diacrylate;

20% to 25% w/w of 1,3-Hexanediol, 2-ethyl-, polymer with 1,6-diisocyanatohexane, 2-hydroxyethyl acrylate- and propylene glycol monoacrylate-blocked;

20% to 25% w/w of Hexanedioic acid, polymer with 1,2-ethanediol and 5-isocyanato-1-(isocyanatomethyl)-1,3,3-trimethylcyclohexane, 2-hydroxyethyl acrylate-blocked;

1.9%±0.5% w/w of 1-Hydroxycyclohexyl phenyl ketone;

0.43%±0.05% w/w of Ethyl trimethylbenzoyl phenylphosphinate;

0.07±0.05% w/w of Diphenyl (2, 4, 6-trimethyl benzoyl) phosphine oxide;

1%-9% w/w silicon dioxide;

and less than 0.19% w/w of 2-hydroxyethyl acrylate.

\* \* \* \* \*